(12) United States Patent
Arseneault et al.

(10) Patent No.: US 8,341,107 B2
(45) Date of Patent: *Dec. 25, 2012

(54) ORGANICALLY RANKED KNOWLEDGE CATEGORIZATION IN A KNOWLEDGE MANAGEMENT SYSTEM

(76) Inventors: Robert L. Arseneault, Manchester, NH (US); Vani T. Chiganmy, Nashua, NH (US); Robert Cohen, Needham, MA (US); David P. Cokely, Portsmouth, NH (US); Enzo Guadagnoli, Brookline, NH (US); David M. Heath, Windham, NH (US); Stefanie L. Moses, Chester, NH (US); Sergio A. Rubio, Chester, NH (US); Hector C. Torres, Billerica, MA (US)

(*) Notice: Subject to any disclaimer, the term of this patent is extended or adjusted under 35 U.S.C. 154(b) by 0 days.

This patent is subject to a terminal disclaimer.

(21) Appl. No.: 13/323,777

(22) Filed: Dec. 12, 2011

(65) Prior Publication Data

US 2012/0084290 A1     Apr. 5, 2012

Related U.S. Application Data

(62) Division of application No. 11/761,776, filed on Jun. 12, 2007, now Pat. No. 8,078,565.

(51) Int. Cl.
*G06F 17/00* (2006.01)
*G06N 5/02* (2006.01)

(52) U.S. Cl. ......................................................... 706/50
(58) Field of Classification Search ...................... None
See application file for complete search history.

(56) References Cited

U.S. PATENT DOCUMENTS

| | | | |
|---|---|---|---|
| 2003/0158867 A1* | 8/2003 | Goodwin et al. | 707/200 |
| 2006/0112095 A1* | 5/2006 | Xie et al. | 707/5 |
| 2007/0219958 A1* | 9/2007 | Park et al. | 707/3 |

* cited by examiner

*Primary Examiner* — Jeffrey A Gaffin
*Assistant Examiner* — Li-Wu Chang
(74) *Attorney, Agent, or Firm* — Steven M. Greenberg, Esq.; Carey Rodriguez Greenberg & O'Keefe, LLP

(57) ABSTRACT

Embodiments of the present invention address deficiencies of the art in respect to expert modeling in a KM system and provide method, system and computer program product for organically ranked knowledge and categorization for a KM system. In one embodiment of the invention, a method for organically ranked knowledge and categorization in a KM system can be provided. The method can include bookmarking answer content for a first end user of the knowledge management system, suggesting a set of categories previously associated with the answer content by other end users of the knowledge management system, and categorizing the bookmarked answer content with a category selected from the set of categories.

13 Claims, 2 Drawing Sheets

ORGANICALLY RANKED KNOWLEDGE CATEGORIZATION IN A KNOWLEDGE MANAGEMENT SYSTEM

CROSS-REFERENCE TO RELATED APPLICATIONS

This application is a Divisional of U.S. application Ser. No. 11/761,776 filed on Jun. 12, 2007, now issued as U.S. Pat. No. 8,078,565, which is incorporated herein by reference in its entirety.

BACKGROUND OF THE INVENTION

1. Field of the Invention

The present invention relates to the field of customer relationship management and more particularly to automated inquiry resolution for customer relationship management systems.

2. Description of the Related Art

The corporate enterprise faces a difficult challenge when attempting to simultaneously improve the quality of customer service while reducing service costs. More products, growing product complexity, third party original equipment manufacturer components, and rapid change substantially increase the amount of information required to answer customer questions and troubleshoot problems. Paradoxically, this information overload has produced an information famine in which the growth of information availability increases the difficulty of finding relevant information—particularly in an online, automated computing environment.

For the corporate enterprise to improve self-service adoption rates, increase call center efficiency and improve response accuracy, solutions are required that assist each of agents, customers, partners and suppliers in finding answers to questions more efficiently. As a result, effective solutions to information search and retrieval have become critical to inquiry resolution. One popular approach includes deploying a search engine that allows users to sift through many information sources. Typically, search engines offer any or a combination of a keyword, simple text and natural language query interface.

While the utilization of a search engine for self-service information retrieval for inquiry resolution has become commonly understood, this approach has demonstrated significant limitations. In particular, the search engine is best suited for use by expert users who are familiar with the content and terminology being searched and who know which search words will most quickly yield a correct answer. However, users without domain expertise cannot easily apply the precision and relevance required for efficient retrieval. Most will recall the experience of entering a few keywords into a search engine only to receive a resulting set of hits numbering in the thousands.

To address the limitations of the basic search engine for information retrieval, the corporate enterprise has turned to the knowledge management (KM) system to better manage and share information. The KM system has been defined as an "IT (Information Technology)-based system developed to support and enhance the organizational processes of knowledge creation, storage/retrieval, transfer, and application." The KM system intends to enable users to access to knowledge of facts, sources of information, and solutions of an organization in the course of inquiry resolution.

The modern KM system often takes the form of a document based system utilizing technologies that permit the creation, management and sharing of formatted documents. Advanced forms of the KM system include ontology based systems incorporating terminologies used to summarize a document, and artificial intelligence (AI) technologies utilizing a customized representation scheme to represent a problem domain. Generally, in a modern KM system, for inquiry resolution one or more answering servers process answer client requests for solutions statically with returned content, or actively with the conduct of a transaction.

The modern KM system provides a knowledgebase of articles answering questions posed by inquiring users. The inquiring users generally not only include customers, but also include customer service representatives seeking answers to customer questions. Inquiring users arrive at the desired article either by direct search engine query, through case based reasoning, or through AI based expert modeling in which a sub-set of selected articles are presented by reference to the inquiring user as a best guess of the desired articles.

The latter mechanism can be quite complex, however, in that in many KM system implementations an intensive manual process can be undertaken at great expense to provide the data necessary to enable the AI mechanism. In particular, the manual process often involves the collection of the statistical preferences of domain experts to produce a set of metrics ranking each article relative to a posed question. Consequently, the highest ranking articles are presented in a list to an inquiring user in response to the posed question. Due to the cost of enabling the AI mechanism, the AI mechanism has been omitted from many a KM system.

BRIEF SUMMARY OF THE INVENTION

Embodiments of the present invention address deficiencies of the art in respect to expert modeling in a KM system and provide method, system and computer program product for organically ranked knowledge and categorization for a KM system. In one embodiment of the invention, a method for organically ranked knowledge and categorization in a KM system can be provided. The method can include bookmarking answer content for a first end user of the knowledge management system, suggesting a set of categories previously associated with the answer content by other end users of the knowledge management system, and categorizing the bookmarked answer content with a category selected from the set of categories.

In this regard, in an aspect of the embodiment, suggesting a set of categories previously associated with the answer content by other end users of the knowledge management system can include sorting a set of categories previously associated with the answer content by other end users of the knowledge system according to a rank order determined by self-learning scores for each of the categories, and presenting the sorted set of categories to the first end user. Additionally, the method can include adjusting the self-learning scores for the categories to account for the selected category. Yet further, the method can include weighting different ones of the self-learning scores to account for category selections by expert end users of the knowledge management system.

In another aspect of the embodiment, uncategorized answer content can be compared to already categorized content to identify similar answer content. Thereafter, uncategorized answer content can be categorized with categories already associated with similar categorized answer content. Finally, in yet another aspect of the embodiment, the method even yet further can include bookmarking additional answer content for the first end user already categorized with the selected category by the other end users of the knowledge management system. In this way, answer content most likely to be relevant to the end user can be provided proactively to the end user without requiring intervention on behalf of the end user.

In another embodiment of the invention, a KM data processing system can be provided. The system can include a data store of categorizations including records associating answer content in the knowledge management data processing system with end user applied categories. The system also can include \an expert modeler coupled to the data store and configured to apply a ranked order to sub-sets of categories in the data store of categorizations according to self-learning scores applied to the categories. Finally, the system can include organic ranked knowledge categorization logic. The logic can include program code enabled to suggest a set of categories previously associated with end user bookmarked answer content by other end users of the knowledge management system and to categorize the bookmarked answer content with a category selected from the set of categories.

Additional aspects of the invention will be set forth in part in the description which follows, and in part will be obvious from the description, or may be learned by practice of the invention. The aspects of the invention will be realized and attained by means of the elements and combinations particularly pointed out in the appended claims. It is to be understood that both the foregoing general description and the following detailed description are exemplary and explanatory only and are not restrictive of the invention, as claimed.

BRIEF DESCRIPTION OF THE SEVERAL VIEWS OF THE DRAWINGS

The accompanying drawings, which are incorporated in and constitute part of this specification, illustrate embodiments of the invention and together with the description, serve to explain the principles of the invention. The embodiments illustrated herein are presently preferred, it being understood, however, that the invention is not limited to the precise arrangements and instrumentalities shown, wherein.

DETAILED DESCRIPTION OF THE INVENTION

Embodiments of the present invention provide a method, system and computer program product for organically ranked knowledge and categorization in a KM system. In accordance with an embodiment of the present invention, prior categorizations of an answer object can be presented to a question posing client seeking to categorize the answer object. The ordering of the categorizations can derive from a frequency of categorization for the answer object for the prior categorizations. Thereafter, the categorized answer objects can form a basis for automatic categorization of similar, non-categorized answer objects where the categorized answer objects serving as positive category examples.

Figure 1:
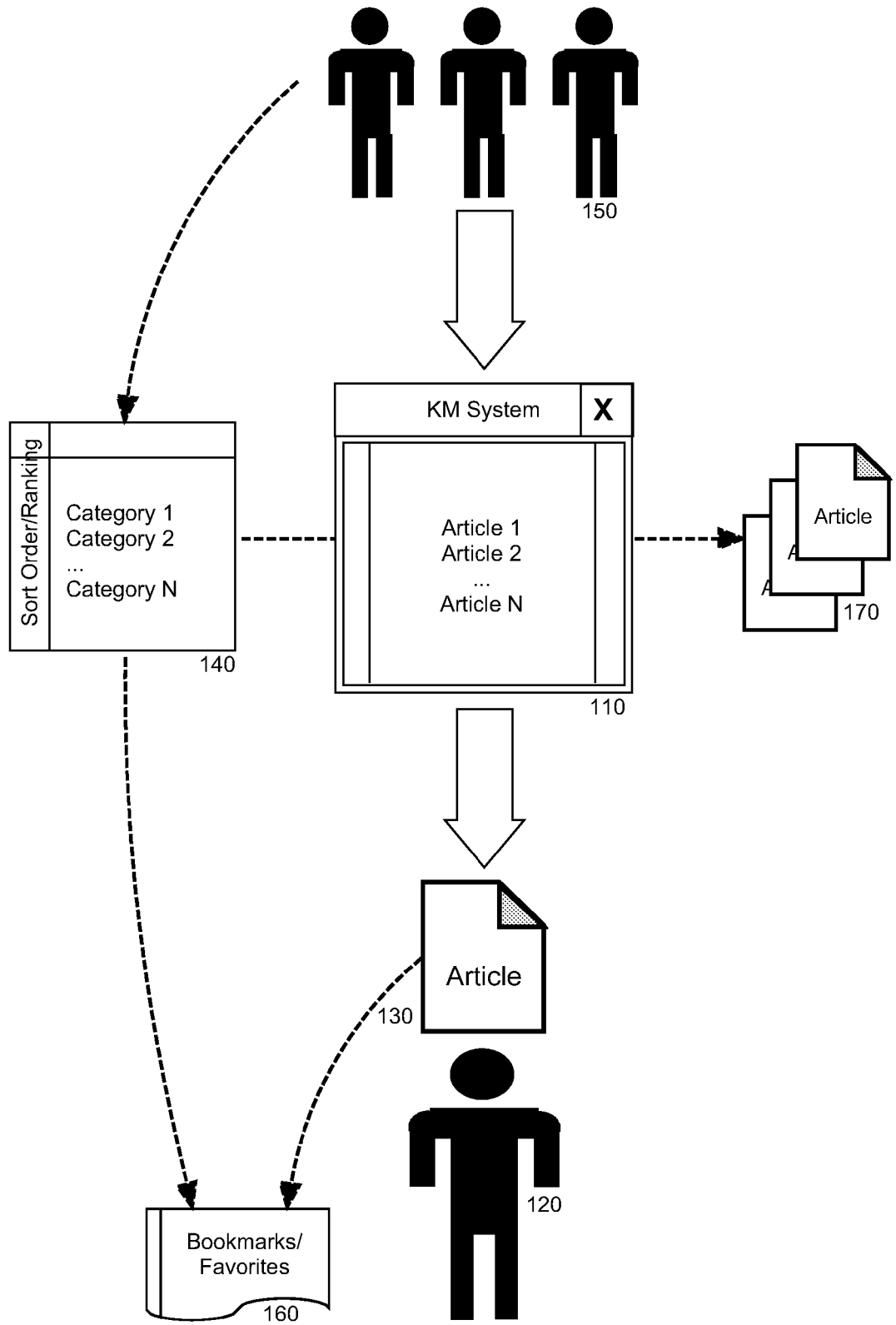
FIG. 1 is a pictorial illustration of a KM system configured for organically ranked knowledge and categorization.

In further illustration, FIG. 1 is a pictorial illustration of a KM system configured for organically ranked knowledge and categorization. As shown in FIG. 1, a KM system 110 can be accessed by a querying user 120 seeking knowledge in response to a posed question. In response to the posed question, the KM system 110 can provide a set of answer content, for example articles, in consequence of which the querying user 120 can select particular answer content 130 of interest. To the extent that the querying user 120 desires to recall the selected answer content 130 at a later time, the querying user 120 can "bookmark" the selected answer content 130 by adding the selected answer content to the favorites 160 for the querying user 120.

Upon the querying user 120 adding the selected answer content 130 to the favorites 160, the KM system 140 can prompt the querying user 120 to categorize the selected answer content 130. In this regard, a sorted listing of selected categories 140 can be provided to the querying user 120. The sorted listing of selected categories 140 can include a ranked ordering of categories previously assigned to the selected answer content by other users 150 of the KM system 110 and ranked according to self-learning scores applied to each of the categories. The querying user 120 can select a category in the sorted listing of selected categories 140, or the querying user 120 can apply a new category. In either circumstance, the self-learning scores for the categories can be adjusted to account for the selection of the querying user 120.

Notably, the sorted listing of selected categories 140 can be applied to other answer content 170 automatically by comparing the other answer content 170 to similar answer content already categorized according to the sorted listing of selected categories 140. Additionally, the categorizations applied by the other users 150 can be weighted according to the perceived expertise of different ones of the other users 150. In this regard, it will be recognized that some of the other users 150 will be frequent contributors of answer content demonstrating a degree of expertise able to factored into the self-learning scores for the categories of the KM system 110. Finally, once a category has been added to the favorites 160 for the querying user 120, additional answer content categorized according to the added category can be added to the bookmarks though unsolicited by the querying user 120 in order to promote the additional answer content as relevant to related queries.

Figure 2:
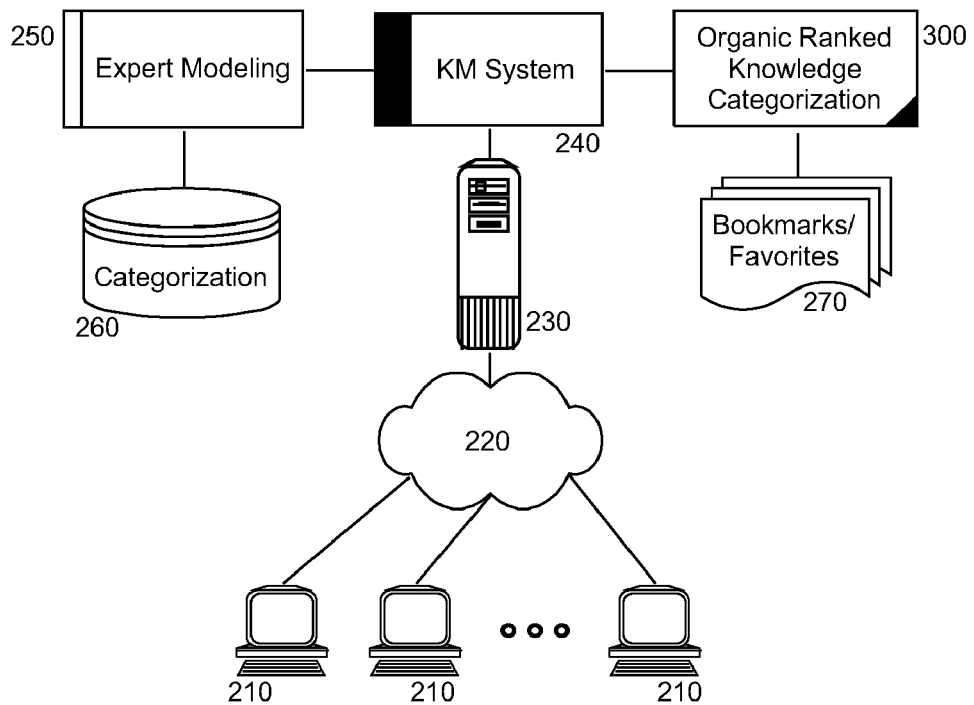
FIG. 2 is a schematic illustration of a KM system configured for organically ranked knowledge and categorization for a KM system; and, FIG. 3 is a flow chart illustrating a process for organically ranked knowledge and categorization in the KM system of FIG. 2.

In further illustration, FIG. 2 is a schematic illustration of a KM system configured for organically ranked knowledge and categorization for a KM system. The system can include an answering server 230 coupled to a KM system 240. The answering server 230 can be configured for communicative linkage to one or more client computing devices 210 over a computer communications network 220. In this regard, each of the client computing devices 210 can include a computing platform, for instance a personal computer, personal digital assistant or computing enabled wireless phone through which querying users can post questions to the KM system 240 and receive answer content from the KM system 240.

The KM system 240 can be configured to categorize answer content provided by the KM system 240 in response to user provided questions. The categories can be associated with answer content in a data store of categorizations 260. The data store of categorizations 260 can include a set of records specifying different answer content and correspondingly linked categories. Of note, the answer content in the data store of categorizations 260 can be linked to different categories by different end users such that observable metrics can be computed for the answer content and for the categories including a frequency of association of different categories to different answer content and a number of associations established between different categories and answer content. Using the observable metrics, contributing end users can be ranked—those end users having answer content more frequently linked having a higher ranking while those end users having answer content often found to be obsolete having a lower ranking.

Consequently, expert modeling logic 250 coupled to the KM system 240 and to the data store of categorizations 260 can process the observable metrics for selected instances of answer content to provide a rank ordering of categories. In this regard, organic ranked knowledge categorization logic 300 can be coupled to the KM system 240 and can include program code enabled to provide the rank ordering of categories to an end user in response to the end user bookmarking answer content received from the KM system 240. The end user, in turn, can select one of the categories in the rank ordering to be applied to the bookmarked answer content, or the end user can create a new category for the bookmarked answer content. In either circumstance, the expert modeling logic 250 can adjust the observable metrics to account for the end user categorization of the bookmarked answer content.

Notably, the program code of the organic ranked knowledge characterization 300 can be further enabled to process uncategorized answer content by assigning categories to uncategorized answer content corresponding to categories already assigned to comparable answer content. In particular, uncategorized answer content can be compared to already categorized answer content and when uncategorized answer content is determined to be similar enough to categorized answer content, a predominant category assigned to the categorized answer content likewise can be assigned to the similar, uncategorized answer content. In this way, structure can be established for amorphous knowledge in a knowledge base leveraging the subjective structuring preferences of the users of the knowledge base.

Figure 3:
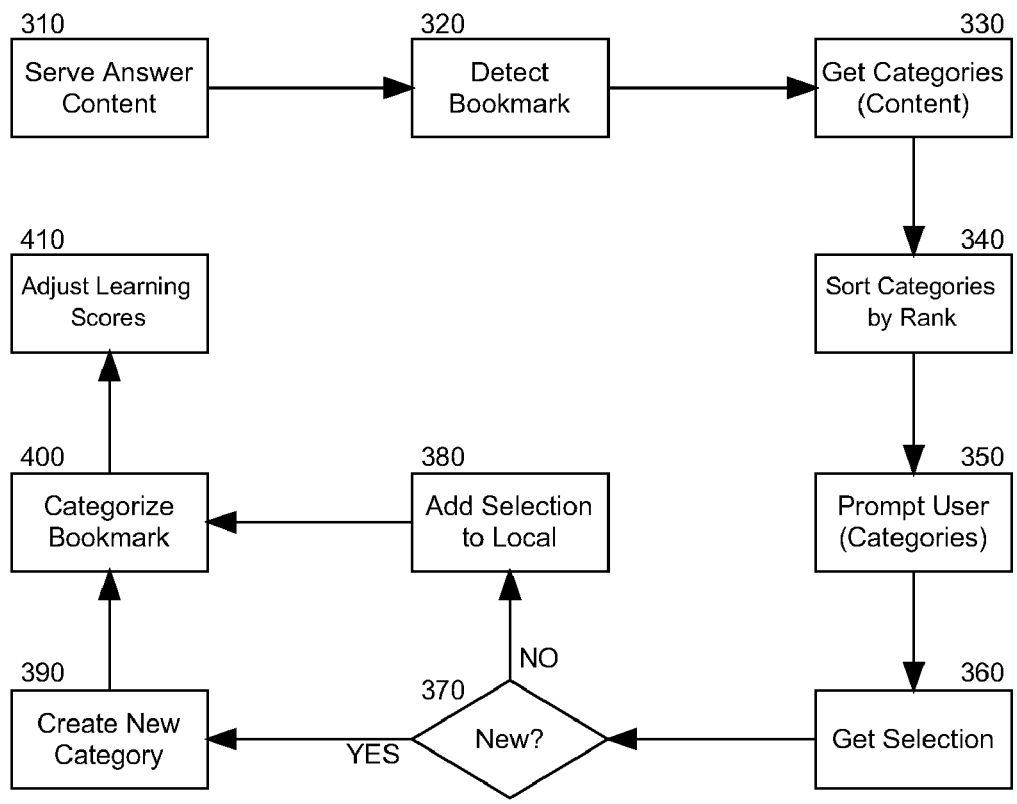

In yet further illustration of the operation of the organic ranked knowledge categorization logic 300, FIG. 3 is a flow chart illustrating a process for organically ranked knowledge and categorization in the KM system of FIG. 2. Beginning in block 310, answer content can be served to an end user of the KM system. In block 320, the bookmarking of the answer content can be detected and in block 330, a set of categories can be retrieved for the answer content as previously applied by other users of the KM system. Thereafter, in block 340 the categories in the set can be sorted by rank and the end user can be prompted to select one of the categories in the set in block 350.

In block 360, a selection of a category by the end user can be determined. In decision block 370, it can be further determined whether the end user selected a category from amongst the rank ordered categories in the set, or whether the end user selected a new category. In the former circumstance, in block 380 the selected category can be added locally to the bookmarks of the end user and in block 400 the bookmark can be categorized as such. Optionally, answer content previously categorized by other end users under the selected category can be proactively bookmarked locally for the end user. In the latter circumstance, however, a new category can be created and locally to the bookmarks in block 390 and again the bookmark can be categorized as such in block 400. Finally, in block 410 the learning scores for the categories can be adjusted to reflect the end user selection.

In an optional embodiment, the movement of answer content by different end users from one category to another can be monitored. When enough end users have re-categorized answer content from one category to another, the end users who have linked to the category can be notified of the impending obsolescence of the category. In this way, end users can remain abreast of knowledge trends.

Embodiments of the invention can take the form of an entirely hardware embodiment, an entirely software embodiment or an embodiment containing both hardware and software elements. In a preferred embodiment, the invention is implemented in software, which includes but is not limited to firmware, resident software, microcode, and the like. Furthermore, the invention can take the form of a computer program product accessible from a computer-usable or computer-readable medium providing program code for use by or in connection with a computer or any instruction execution system.

For the purposes of this description, a computer-usable or computer readable medium can be any apparatus that can contain, store, communicate, propagate, or transport the program for use by or in connection with the instruction execution system, apparatus, or device. The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution. Input/output or I/O devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modem and Ethernet cards are just a few of the currently available types of network adapters.

We claim:

1. In a knowledge management system; a method for organically ranked knowledge and categorization, the method comprising:

bookmarking answer content for a first end user of the knowledge management system executing in memory of a computer;

suggesting a set of categories previously associated with the answer content by other end users of the knowledge management system;

categorizing the bookmarked answer content with a category selected from the set of categories;

monitoring re-categorization of answer content; and, notifying selected ones of the end users linked to categories from which a threshold amount of answer content has been re-categorized.

2. The method of claim 1, further comprising adjusting self-learning scores for the categories to account for the selected category.

3. The method of claim 1, further comprising weighting different self-learning scores to account for category selections by expert end users of the knowledge management system.

4. The method of claim 1, further comprising:
comparing uncategorized answer content to already categorized content to identify similar answer content; and,
associating uncategorized answer content with categories already associated with similar categorized answer content.

5. The method of claim 1, further comprising bookmarking additional answer content for the first end user already categorized with the selected category by the other end users of the knowledge management system.

6. A knowledge management data processing system comprising:
a computer with at least one processor and memory;
a data store of categorizations coupled to the computer and comprising records associating answer content in the knowledge management data processing system with end user applied categories;
an expert modeler coupled to the data store, executing in the memory of the computer and configured to apply a ranked order to sub-sets of categories in the data store of categorizations according to self-learning scores applied to the categories; and,
organic ranked knowledge categorization logic comprising program code enabled when executed by at least one processor of the computer to suggest a set of categories previously associated with end user bookmarked answer content by other end users of the knowledge management system and to categorize the bookmarked answer content with a category selected from the set of categories, to monitor re-categorization of answer content and to notify end users linked to categories from which a threshold amount of answer content has been re-categorized.

7. The system of claim 6, wherein the self-learning scores are weighted for scores applied by expert ones of the other end users.

8. The system of claim 6, wherein the answer content are articles in the knowledge management system.

9. A knowledge management computer program product comprising a non-transitory computer usable storage medium embodying computer usable program code for organically ranked knowledge and categorization, the computer program product comprising:
computer usable program code for bookmarking answer content for a first end user of a knowledge management system;
computer usable program code for suggesting a set of categories previously associated with the answer content by other end users of the knowledge management system;
computer usable program code for categorizing the bookmarked answer content with a category selected from the set of categories;
computer usable program code for monitoring re-categorization of answer content; and,
computer usable program code for notifying end users linked to categories from which a threshold amount of answer content has been re-categorized.

10. The computer program product of claim 9, further comprising computer usable program code for adjusting self-learning scores for the categories to account for the selected category.

11. The computer program product of claim 9, further comprising computer usable program code for weighting different self-learning scores to account for category selections by expert end users of the knowledge management system.

12. The computer program product of claim 9, further comprising:
computer usable program code for comparing uncategorized answer content to already categorized content to identify similar answer content; and,
computer usable program code for associating uncategorized answer content with categories already associated with similar categorized answer content.

13. The computer program product of claim 9, further comprising computer usable program code for bookmarking additional answer content for the first end user already categorized with the selected category by the other end users of the knowledge management system.

* * * * *